US012596609B2

(12) United States Patent
Wu

(10) Patent No.: US 12,596,609 B2
(45) Date of Patent: Apr. 7, 2026

(54) ERROR DETECTION IN COMMUNICATIONS OVER SERIAL PERIPHERAL INTERFACES

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/834,414

(22) Filed: Jun. 7, 2022

(65) Prior Publication Data

US 2023/0393931 A1 Dec. 7, 2023

(51) Int. Cl.
| | |
|---|---|
| *G06F 11/10* | (2006.01) |
| *G06F 11/07* | (2006.01) |
| *G06F 11/14* | (2006.01) |
| *G06F 11/30* | (2006.01) |
| *G06F 13/42* | (2006.01) |

(52) U.S. Cl.
CPC ...... *G06F 11/1004* (2013.01); *G06F 11/0772* (2013.01); *G06F 11/141* (2013.01); *G06F 11/3027* (2013.01); *G06F 13/4282* (2013.01)

(58) Field of Classification Search
CPC . G06F 11/0772; G06F 11/1004; G06F 11/141
See application file for complete search history.

(56) References Cited

U.S. PATENT DOCUMENTS

| | | | |
|---|---|---|---|
| 11,301,414 B1* | 4/2022 | Poplack | G06F 13/4291 |
| 2020/0381072 A1* | 12/2020 | Sasselli | G06F 9/30029 |
| 2023/0132069 A1* | 4/2023 | Hoel | H03M 13/6508 |
| | | | 714/758 |
| 2023/0176944 A1* | 6/2023 | Kannan | G06F 11/1004 |
| | | | 714/758 |

OTHER PUBLICATIONS

Gümüs et al., "Comparison of single ended and differential signalling for wired biomedical implants using SPI communication with Reed Solomon Error Correction codes," 2017, 13th IASTED International Conference on Biomedical Engineering (BioMed), Innsbruck, Austria, pp. 114-120 (Year: 2017).*
Shah, Aditi, "Arduino—SPI", Vicara Hardware University, Jan. 18, 2021, https://medium.com/vicara-hardware-university/arduino-spi-c922d157edf0 (Year: 2021).*

* cited by examiner

*Primary Examiner* — Michael Maskulinski
(74) *Attorney, Agent, or Firm* — Greenberg Traurig

(57) ABSTRACT

A memory device and a host system configured to transmit, using serial peripheral interfaces, an item (e.g., a command, an address, or a data item) followed by a cyclic redundancy check value of the item using operations same as transmission of one or more bits of the item. If the received cyclic redundancy check value does not match with the cyclic redundancy check value computed from the received item, an interrupt signal can be transmitted via a control line of a serial peripheral interface bus to request re-transmission of the item. When the host system detects a transmission error in receiving data from the memory device the serial peripheral interface bus, the host system can terminate the read command and re-transmit the read command.

17 Claims, 6 Drawing Sheets

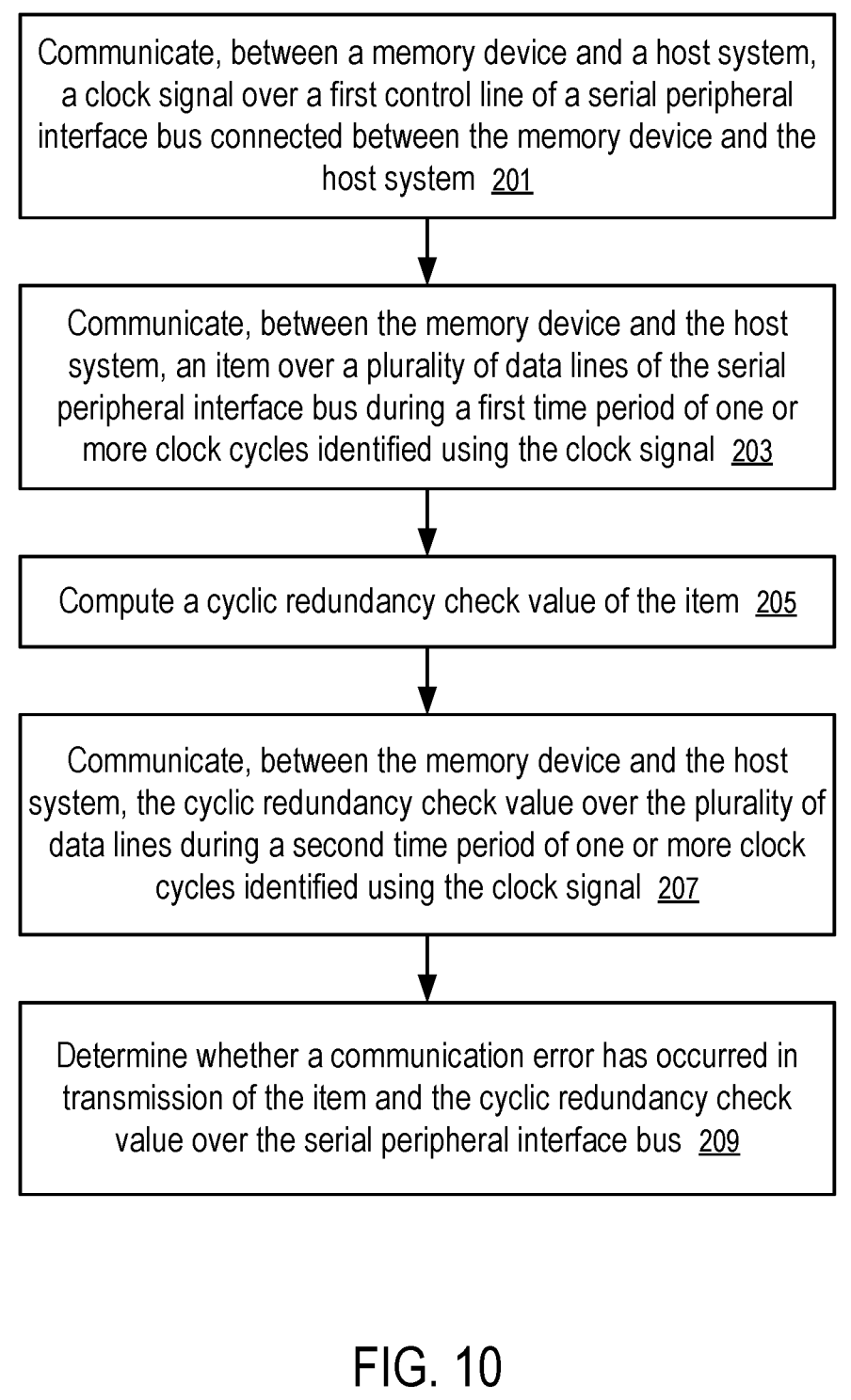

Communicate, between a memory device and a host system, a clock signal over a first control line of a serial peripheral interface bus connected between the memory device and the host system  201

Communicate, between the memory device and the host system, an item over a plurality of data lines of the serial peripheral interface bus during a first time period of one or more clock cycles identified using the clock signal  203

Compute a cyclic redundancy check value of the item  205

Communicate, between the memory device and the host system, the cyclic redundancy check value over the plurality of data lines during a second time period of one or more clock cycles identified using the clock signal  207

Determine whether a communication error has occurred in transmission of the item and the cyclic redundancy check value over the serial peripheral interface bus  209

FIG. 10

ERROR DETECTION IN COMMUNICATIONS OVER SERIAL PERIPHERAL INTERFACES

TECHNICAL FIELD

At least some embodiments disclosed herein relate to memory systems in general, and more particularly, but not limited to memory systems communicating via Serial Peripheral Interfaces.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 10 shows a method to detect errors in communications over a serial peripheral interface according to one embodiment.

DETAILED DESCRIPTION

At least some aspects of the present disclosure are directed to error detection in communications through serial peripheral interfaces.

Memory devices implemented using NOR memory cells have been used recently in automotive systems as boot devices. NOR memory cells are reliable and fast (e.g., in comparison with NAND memory cells). A boot loader, firmware, and/or software (e.g., operating system, applications) can be stored in a NOR memory device as a boot device accessible, through a serial peripheral interface (SPI) bus, by a computing device in an automotive vehicle. However, a conventional serial peripheral interface (SPI) protocol for a computer bus does not have an error detection mechanism. When errors resulting from transmission over a conventional serial peripheral interface (SPI) bus are not detected, the reliability and safety of a vehicle using such a boot device can be reduced.

At least some aspects of the present disclosure address the above and other deficiencies by implementing an error detection mechanism in a serial peripheral interface (SPI) protocol. Using the error detection mechanism, errors introduced in communication on a conventional serial peripheral interface (SPI) bus can be detected to improve reliability and safety, such as the reliability and safety of an automotive vehicle configured to use an SPI NOR memory device as a boot device to store mission critical data.

For example, the error detection mechanism can be implemented using a technique of cyclic redundancy check (CRC). CRC data can be generated for commands, addresses, and/or data items transmitted over serial peripheral interface (SPI) buses. The CRC data can be transmitted over the serial peripheral interface (SPI) buses following the transmission of the respective commands, addresses, and/or data items. A memory device, or a host system, as a recipient can determine whether there is an error in the transmission by comparing the received CRC data with the CRC data generated from the received command, address or data item. When there is a mismatch between the computed CRC data and the received CRC data, a transmission error is detected.

When a memory device detects an error in a received command, address, or data item using the corresponding CRC data, the memory device can be configured to set an error bit in a status register and/or toggle an interrupt line of the bus to request re-transmission of the command, address, or data item.

During a read operation, when a host detects an error in a data item received from the memory device using the corresponding CRC data of the data item, the host can stop the current read operation and request the read again.

By detecting communication errors in serial peripheral interface (SPI) buses and requesting re-transmission of the received commands, addresses, and data items having transmission errors, the reliability and safety of automotive vehicles configured to use SPI NOR memory devices as boot devices are improved.

Figure 1:
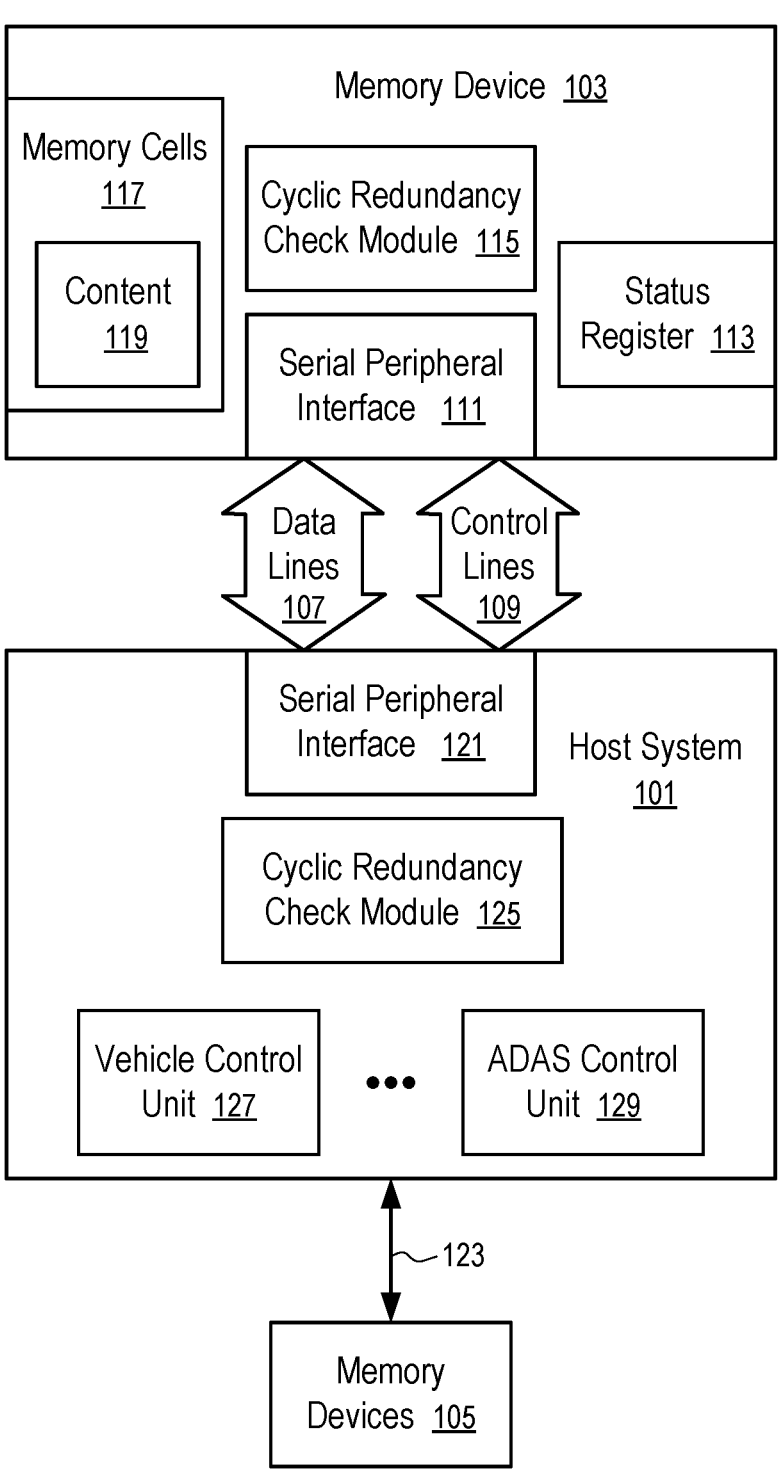
FIG. 1 illustrates an example computing system having a memory device in accordance with some embodiments of the present disclosure.

FIG. 1 illustrates an example computing system having a memory device in accordance with some embodiments of the present disclosure.

In FIG. 1, a computing system has a memory device 103 and a host system 101 connected via a serial peripheral interface (SPI) bus having data lines 107 and control lines 109. Optionally, the host system 101 is further connected to additional memory devices 105 via connections 123, such as a serial peripheral interface (SPI) bus, a peripheral component interconnect express (PCIe) bus, a universal serial bus (USB) bus, or another bus.

For example, the memory device 103 can be configured as a boot device with content 119 stored in NOR memory cells 117. The content 119 can include instructions executable in the host system 101 as a boot loader, firmware/software, an operating system, an application, etc., and input data for the instructions. Optionally, a portion of output generated from the execution of the instructions can be stored into the memory cells 117.

For example, the computing system can be configured on an automotive vehicle to control certain operations of the vehicle.

For example, the host system 101 can include a vehicle control unit 127 configured to provide such services as reading sensors, motor control, torque coordination, operation and gearshift strategies, voltage coordination, charging control, on board diagnosis, monitoring, thermal management, etc.

For example, the host system 101 can include a control unit 129 of Advanced Driver Assistance System (ADAS) to fuse sensor data from cameras, lidar, radar, inertial measurement unites (IMUs), and/or map data, for perception and decision making.

For example, the content 119 stored in the memory cells 117 of the memory device 103 can include a boot loader, firmware, software, operating systems, application, etc., of the vehicle control unit 127, the ADAS (Advanced Driver Assistance System) control unit (129), and/or the host system 101.

In FIG. 1, the memory device 103 and the host system 101 are connected via a serial peripheral interface (SPI) bus having data lines 107 and control lines 109. Each of the lines has a signal connection usable to transmit a signal between from a pin of the serial peripheral interface (SPI) 111 of the memory device 103 and a corresponding pin of the serial peripheral interface (SPI) 121 of the host system 101.

For example, the control lines 109 can include a line to transmit a clock signal, a line to transmit an interrupt signal, etc.

For example, the data lines 107 can include a predetermined number of lines to transmit signals representative of bits of a command, address, or data item according to the clock signal. Each of the data line 107 can transmit a signal independent of other lines; and the data lines 107 or a subset of the data lines 107 can be used as a group to transmit the bits of a command, address or data item one bit at a time through each line.

The memory device 103 has a cyclic redundancy check (CRC) module 115 configured to compute CRC data for a data item to be transmitted via the data lines 107 serial peripheral interface (SPI) bus to the host system 101. The cyclic redundancy check (CRC) module 115 of the memory device is further configured to check a command, address, and/or data item received via the serial peripheral interface (SPI) bus from the host system 101 using corresponding CRC data received from the host system 101 via the data lines 107 for the command, address and/or data item.

When the memory device 103 detects an error in a received command, address, or data item, the cyclic redundancy check module 115 sets an error bit in the status register 113 and/or toggle a pin connected to the control lines 109. For example, an interrupt pin can be pulled to a low voltage level to request re-transmission of the most recently transmitted command, address, or data item.

Similarly, the host system 101 has a cyclic redundancy check (CRC) module 125 configured to compute CRC data for a command, address, and/or a data item to be transmitted via the data lines 107 of serial peripheral interface (SPI) bus to the memory device 103. The cyclic redundancy check (CRC) module 125 of the host system 101 is further configured to detect errors in a data item received in the serial peripheral interface (SPI) 121 using corresponding CRC data received from the memory device 103 via the data lines 107 for the data item.

When the host system 101 detects an error in a received data item, the host system 101 can terminate the current read operation and restart the previous read operation that has produced the erroneous data item received over the data lines 107.

In general, a piece of CRC data of a data item can be computed from the data item using a predetermined formula. The data item can be transmitted with the CRC data for the recipient to determine whether there is an error in the receive data item by checking whether a corresponding CRC data computed from the received data item agrees with the received CRC data. If there is a mismatch, an error is detected in the received data item and the received CRC data.

For example, to protect the transmission of a n+1 bit data item, a 7-bit CRC value (CRC7) can be computed using a predetermined number x, a generator polynomial $G(x)=x^7+x^3+1$, and a function $M(x)=(\text{first bit})\cdot x^n+(\text{second bit})\cdot x^{n-1}+ \ldots +(\text{last bit})\cdot x^0$. The CRC7 can be computed as CRC $[6:0]=\text{Remainder}[(M(x)\cdot x^7)/G(x)]$.

For example, to protect the transmission of a n+1 bit data item, a 16-bit CRC value (CRC16) can be computed using a predetermined number x, a generator polynomial $G(x) =x^{16}+x^{12}+x^5+1$, and a function $M(x)=(\text{first bit})\cdot x^n+(\text{second}$ $\text{bit})\cdot x^{n-1}+ \ldots +(\text{last bit})\cdot x^0$. The CRC16 can be computed as CRC $[15:0]=\text{Remainder}[(M(x)\cdot x^{16})/G(x)]$.

For example, CRC7 and/or CRC16 can be used in the data lines 107 of the serial peripheral interface (SPI) bus connected between the memory device 103 and the host system 101 to provide an error detection mechanism.

For example, the operations for transmitting the last bit of a command, address, or data item on a data line can be repeated in the next one or more cycles to transmit the CRC data of the corresponding command, address, or data item. A data lines 107 or a subset of the data lines 107 (e.g., 4 or 8 lines) can be used together to transmit the bits of a command, address, or data item, and its CRC data as illustrate din FIG. 2 to FIG. 9.

FIG. 2 to FIG. 9 illustrate transmission of cyclic redundancy check data for error detection in command, address, and data transmitted via a serial peripheral interface according to one embodiment.

Figure 2:
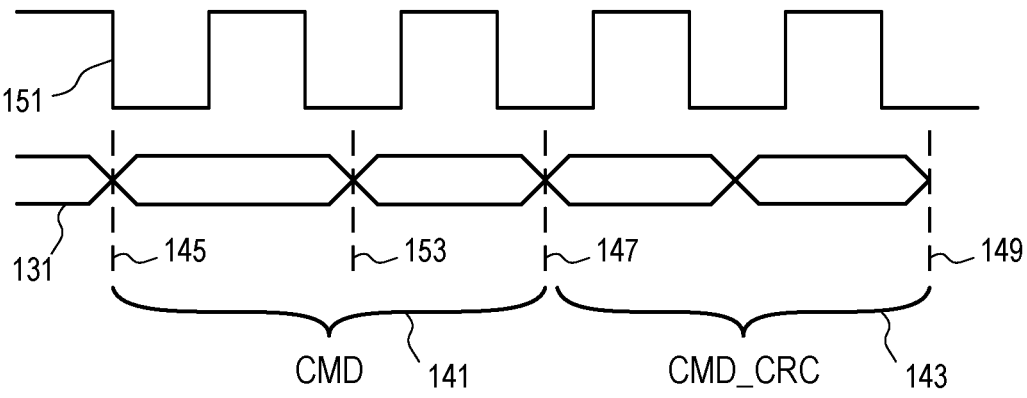
FIG. 2 to FIG. 9 illustrate transmission of cyclic redundancy check data for error detection in command, address, and data transmitted via a serial peripheral interface according to one embodiment.

FIG. 2 illustrates a clock signal 151 transmitted on a clock line among the control lines 109 of a serial peripheral interface (SPI) bus.

A waveform 131 illustrates the signals configured to transmit bits of a command and its CRC data over a group of four data lines 107 of a serial peripheral interface (SPI) bus.

According to a serial peripheral interface (SPI) protocol, a bit of a command from a host system 101 to a memory device 103 is transmitted over a data line 107 using one clock cycle in the clock signal 151. A two clock cycle period 141 from time 145 to time 147 can be used to transmit an 8-bit command using four data lines 107.

The operations of the last clock cycle between time 153 and time 147 can be repeated to extend the transmission of the command in the period 141 by two clock cycles to time 149, as if the time periods 141 and 143 were used to transmit a 16-bit command. The time period 143 between the time 147 and time 149 can be used to transmit the CRC7 of the command two-bit per line in the same way as the transmitting the last bit per line for the command between time 153 and time 147.

Upon receiving from the host system 101 the command in the time period 141 and the CRC data of the command in the time period 143, the cyclic redundancy check module 115 of the memory device 103 can check the received command against the receive CRC data to determine if there is an error in the received command and the received CRC data. If there is an error, the memory device 103 as a recipient can set an error bit in the status register 113 and/or immediately assert an interrupt signal via an interrupt line among the control lines 109 to request the host system 101 as a sender to repeat the transmission of the signals provided in the time periods 141 and 143.

Thus, the likelihood of the memory device 103 executes an erroneous command due to transmission error over a serial peripheral interface (SPI) bus is reduced or eliminated.

Figure 3:
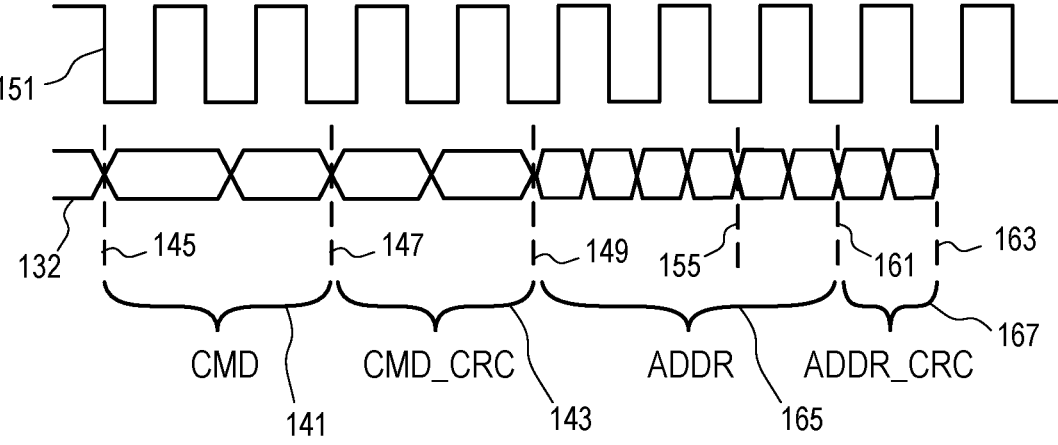

In FIG. 3, after the transmission of a command and its CRC data in the time periods 141 and 143 (e.g., in a way as in FIG. 2), the host system 101 of the memory device 103 can transmit an address in time period 165 between time 149 and time 161, as illustrated by the waveform 132.

According to a serial peripheral interface (SPI) protocol, the host system 101 can transmit, between time 149 and 161, two bits of the address on each data line. One of the two bits transmitted during a clock cycle can be configured for sensing/detection at a rising edge of the clock signal 151; and the other bit can be configured for sensing/detection at a falling edge of the clock signal 151. Thus, the transmitting and receiving operations for each bit of the address in time period 165 are generally different from the transmitting and receiving operations for each bit of the command in time period 141.

For example, when four bit lines are used to transmit the address in the time period 165 of three cycles, a 24-bit address can be transmitted from the host system 101 to the memory device 103.

After time 161, the operations in the last clock cycle between time 155 and 161 can be repeated to extend the transmission of the address by a time period 167 of one clock cycle, as if the time periods 165 and 167 were used to transmit a 32-bit address.

The time period 167 between the time 161 and time 163 can be used provide the CRC7 of the address transmitted in the time period 165. The CRC7 of the address can be transmitted two-bit per line in one clock cycle in the same way as the transmitting the last two bits per line for the address between time 155 and time 161.

Upon receiving the address in time period 165 and the CRC data of the address in time period 167, the memory device 103 can check the received address against the receive CRC data to determine if there is an error in the received command and its CRC data. If there is an error, the memory device 103 can the memory device 103 as a recipient can set an error bit in the status register 113 and/or immediately assert an interrupt signal via an interrupt line among the control lines 109 to request the host system 101 as a sender to repeat the transmission of the signals provided in the time periods 165 and 167.

Thus, the likelihood of the memory device 103 executes a command to operate at an erroneous address due to transmission errors over a serial peripheral interface (SPI) bus is reduced or eliminated.

After the communication of a write command and an address from the host system 101 to the memory device 103, the host system 101 can transmit, via the data lines 107 of the serial peripheral interface (SPI) bus, a data item to be written into the memory device 103 for a write command.

After the communication of a read command and an address from the host system 101 to the memory device 103, the memory device 103 can transmit, via the data lines 107 of the serial peripheral interface (SPI) bus, a data item retrieved from the memory device 103 in response to the read command.

Figure 4:
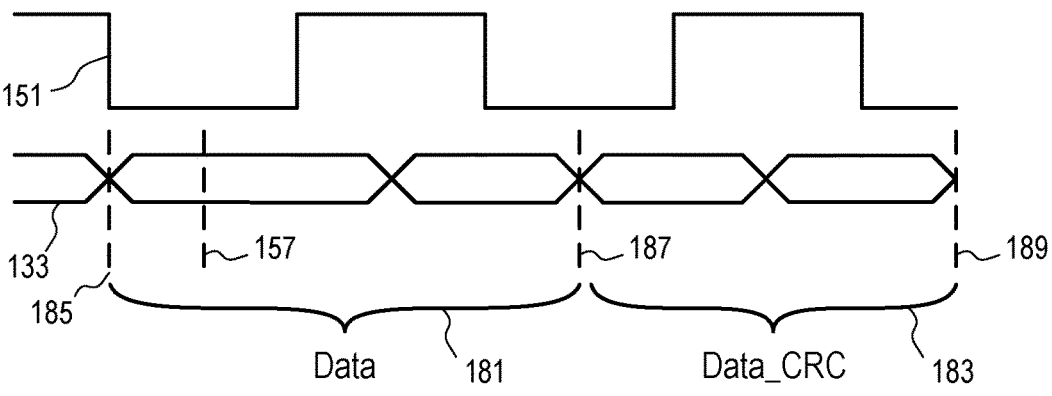
Figure 5:
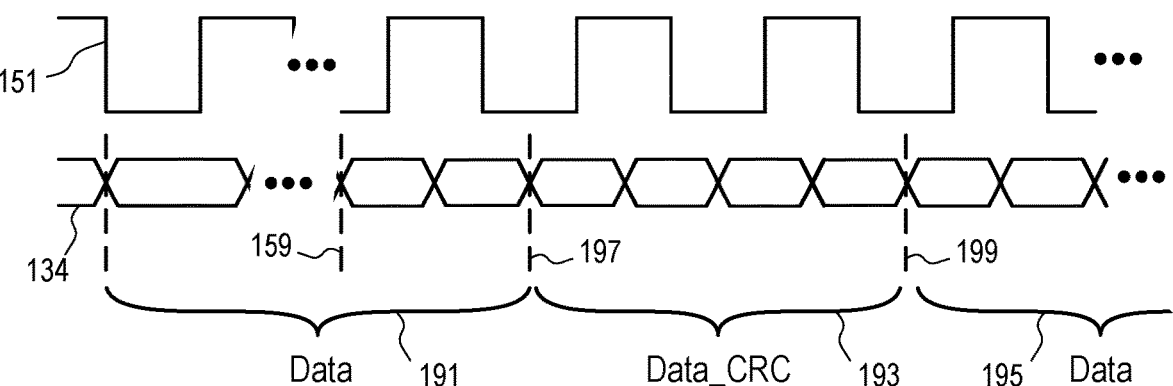

The transmission of data for read and write commands are illustrated in FIG. 4 and FIG. 5, after the transmission of a command and an address as in FIG. 3.

In FIG. 4, data is transmitted one byte at a time over data lines 107. Similar to the transmission of addresses in FIG. 3, data items can be transmitted on data lines 107 two bits per clock cycle. During a first clock cycle in a time period 181 between time 185 and time 187, a byte is transmitted over four data lines 107 (e.g., from the memory device 103 to the host system 101 in response to a read command, or from the host system 101 to the device 103 following a write command). After the time period 181, the operations during the last clock cycle between time 157 to 187 can be repeated for a clock cycle in the time period 183, as if in an attempt to transmit a two-byte data time. During the time period 183 from time 187 to time 189, the CRC7 of the byte transmitted in the time period 181 is transmitted, as illustrated by the waveform 133.

If an error in the byte of data and its CRC data transmitted respectively in the time periods 181 and 183 is detected, the recipient can assert the interrupt signal to request the re-transmission of the byte and its CRC data.

If no error is detected, the next byte can be transmitted in the next clock cycle following the time period 183 of transmitting the CRC data.

In FIG. 5, data is transmitted one block at a time over data lines 107. For example, the data block can have a size of 512 bytes. Similar to the transmission of addresses in FIG. 3, data items can be transmitted on data lines 107 two bits per clock cycle during a time period 191 to transmit the data block. After the time period 191 of transmitting a block of data, the operations for the transmission and reception in the last clock cycle between the time period 159 and 197 can be repeated for two clock cycles as illustrated by the waveform 134 to transmit the CRC16 of the data block transmitted in the time period 191.

If an error in the block of data and its CRC data transmitted respectively in the time periods 191 and 193 is detected, the recipient can assert the interrupt signal to request the re-transmission of the block and its CRC data.

If no error is detected, the next block can be transmitted in the next time period 195 following the time period 193 of transmitting the CRC data from time 197 to time 199.

FIG. 2 to FIG. 5 illustrate the transmission of commands, addresses and data items with CRC data over a group of four data lines 107 if a serial peripheral interface (SPI) bus. FIG. 6 to FIG. 9 illustrate the transmission of commands, addresses and data items with CRC data over a group of eight data lines 107 if a serial peripheral interface (SPI) bus.

Figure 6:
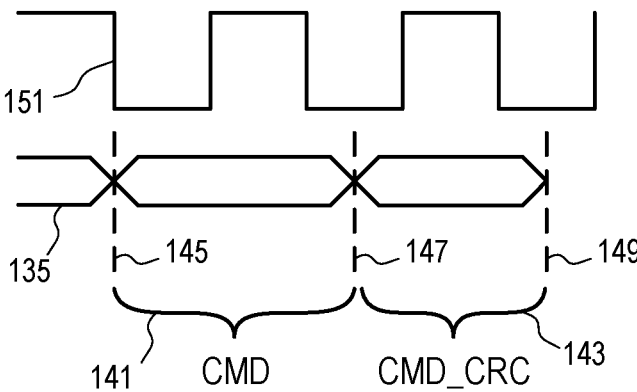

In FIG. 6, a waveform 135 shows the transmission of a 8-bit command in a time period 141 of one clock cycle followed by a time period 143 of one clock cycle for the transmission of the CRC7 of the command.

Figure 7:
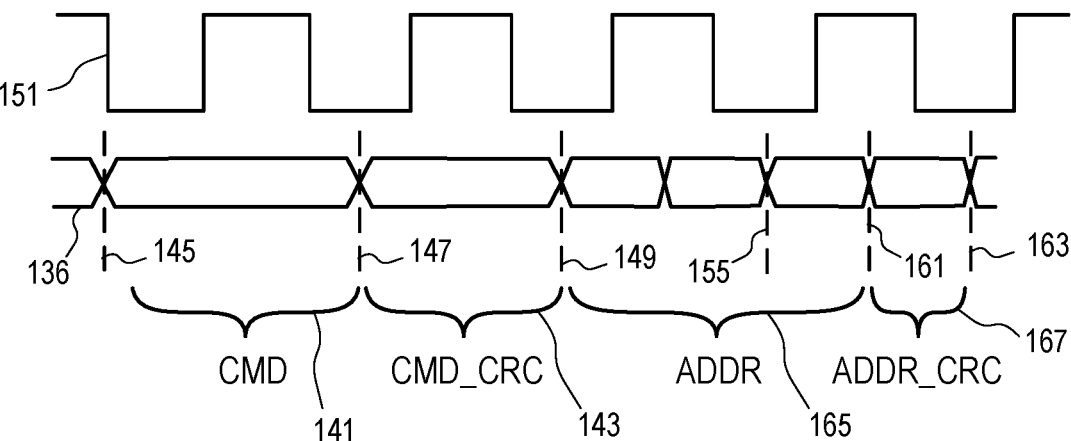

In FIG. 7, a waveform 136 shows the transmission of a 24-bit address in a time period 165 of one and a half of clock cycles followed by a time period 143 of a half clock cycle for the transmission of the CRC7 of the address.

Figure 8:
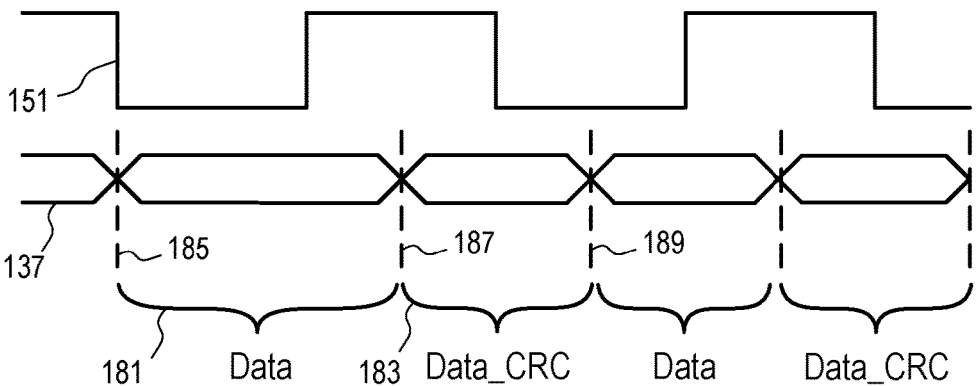

In FIG. 8, a waveform 137 shows the transmission of a byte of a data item during the time period 181 of a half clock cycle followed by another half clock cycle arranged to transmit the CRC7 of the byte. Subsequently, another clock cycle is used to transmit a next byte in the first half and its CRC7 in the next half.

Figure 9:
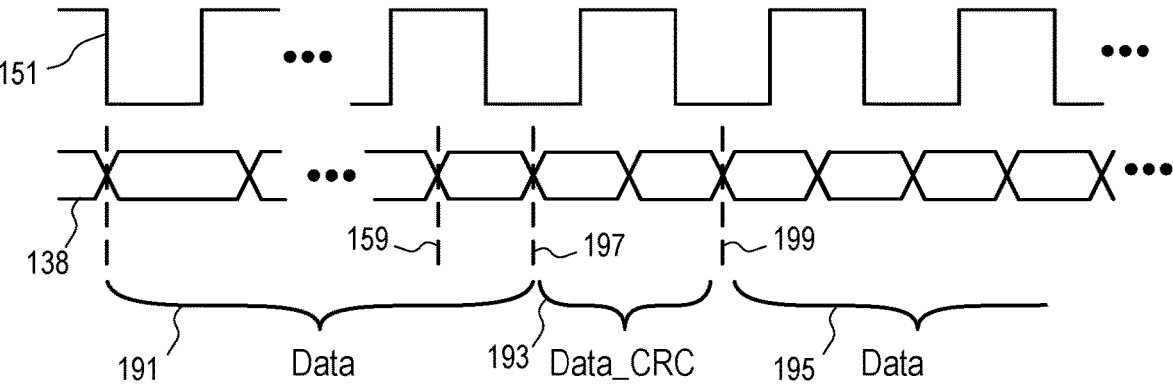

IN FIG. 9, a waveform 138 shows the transmission of a block of a data item during the time period 181, which is followed by a time period 193 of one clock cycle for the transmission of CRC16 of the block transmitted in the time period 181. A next block can be transmitted in a time period following the time period 193 of the CRC16.

FIG. 10 shows a method to detect errors in communications over a serial peripheral interface according to one embodiment.

For example, the method of FIG. 10 can be used by the host system 101 and/or the memory device 103 of FIG. 1 in communication over a serial peripheral interface bus according to FIG. 2 to FIG. 9.

At block 201, a host system 101 communicates to a memory device 103 a clock signal 151 over a first control line 109 of a serial peripheral interface bus connected between the memory device 103 and the host system 101.

At block 203, the memory device 103 and the host system 101 communicate an item over a plurality of data lines 107 of the serial peripheral interface bus during a first time period (e.g., 141, 165, 181, or 191) of one or more clock cycles identified using the clock signal 151.

At block 205, the memory device 103 or the host system 101 computes a cyclic redundancy check value of the item for transmission of the item over the plurality of data lines 107 of the serial peripheral interface bus.

At block 207, the memory device 103 and the host system 101 communicate the cyclic redundancy check value over the plurality of data lines 107 during a second time period (e.g., 143, 167, 183, or 193) of one or more clock cycles identified using the clock signal 151.

For example, the cyclic redundancy check value can be transmitted immediately following the transmission of the last bit of the item in a data line 107, such that the second time period is configured to follow the first time period without a time gap longer than a quarter of a clock cycle. For example, the communications of bits of the cyclic redundancy check value can be transmitted in a same way as transmission of bits of the item. For example, the transmission of an 8-bit command and its CRC7 value can be transmitted in a same way of transmitting a 16-bit command. For example, the transmission of an 24-bit address and its CRC7 value can be transmitted in a same way of transmitting a 32-bit address. For example, the transmission of an 8-bit data item and its CRC7 value can be transmitted in a same way of transmitting a 16-bit address. For example, the transmission of an 512-byte data item and its CRC16 value can be transmitted in a same way of transmitting a 514-byte data item. Such an arrangement minimizes changes to be implemented to support error detection via Cyclic Redundancy Check (CRC).

For example, the item can be a 8-bit command. The 8-bit command can be is transmitted via four data lines 107 in the serial peripheral interface bus over two first clock cycles in the first time period 141 (e.g., as in FIG. 2), or via eight data lines 107 in the serial peripheral interface bus over one first clock cycle in the first time period 141 (e.g., as in FIG. 6). The cyclic redundancy check value (e.g., CRC7) of the 8-bit command can be transmitted via the four data lines over two second clock cycles in the second time period 143 (e.g., as in FIG. 2), or via the eight data lines over one second clock cycle in the second time period 143 (e.g., as in FIG. 6). After the transmission of the 8-bit command, a 24-bit address and a cyclic redundancy check value computed from the 24-bit address can be communicated, e.g., over the four data lines in four clock cycles following the two second clock cycles (e.g., as in FIG. 3), or over the eight data lines in two clock cycles following the one second clock cycle (e.g., as in FIG. 7).

For example, the item can be is 24-bit address. The address and the cyclic redundancy check value can be transmitted via four data lines in the serial peripheral interface bus over four clock cycles in the first time period 165 and the second time period 167 (e.g., in FIG. 3). Alternatively, the address and the cyclic redundancy check value can be transmitted via eight lines in the serial peripheral interface bus over two clock cycles in the first time period 165 and the second time period 167 (e.g., as in FIG. 7).

For example, the item can be an 8-bit data item to be written to the memory cells 117 via the command at the address, or retrieved from the memory cells 117 after execution the command the address. The 8-bit data item and the cyclic redundancy check value can be transmitted via four data lines in the serial peripheral interface bus over two clock cycles in the first time period 181 and the second time period 183 (e.g., as in FIG. 4). Alternatively, the 8-bit data item and the cyclic redundancy check value can be transmitted via eight data lines in the serial peripheral interface bus over one clock cycle in the first time period 181 and the second time period 183 (e.g., as in FIG. 8).

For example, the item can be a 512 byte data block. After the data block is transmitted in the serial peripheral interface bus in the first time period 191, the cyclic redundancy check value can be transmitted via four data lines over two clock cycles in the second time period 193 (e.g., as in FIG. 5), or via eight data lines over one clock cycle in the second time period 193 (e.g., as in FIG. 9).

At block 209, the memory device 103 or the host system 101, as a recipient, determines whether a communication error has occurred in transmission of the item and the cyclic redundancy check value over the serial peripheral interface bus.

For example, to determine whether a communication error has occurred, the recipient can compute a cyclic redundancy check value computed from the item received via the serial peripheral interface bus, and compare the computed cyclic redundancy check value and the cyclic redundancy check value received via the serial peripheral interface bus. If there is a mismatch, a communication error is detected.

For example, when the memory device 103 determines that there is a communication error in a command, an address or a data item received from the host system 101, the memory device 103 can assert an interrupt signal in a second control line 109 of the serial peripheral interface bus. The interrupt signal can cause the host system 101 to re-transmit the item (e.g., command, address or data item to be written into memory cells 117 of the memory device) and the cyclic redundancy check value of the item. Alternatively, or in combination, the memory device can set an error bit in a status register 113 in the memory device 103 in response to a determination that a communication error has occurred in transmission of the item and the cyclic redundancy check value over the serial peripheral interface bus. The error status can be reported to the host system 101 for error handling.

For example, when the host system 101 determines that there is a communication error in a data item retrieved from the memory device 103 (e.g., during execution of a read command), the host system 101 can terminate execution of a current command and re-transmit the current command to the memory device for execution.

In some embodiment, a computing system includes a host system 101 and a memory sub-system containing the memory device 103 and/or the memory devices 105.

The memory sub-system can include media, such as one or more volatile memory devices (e.g., 105), one or more non-volatile memory devices (e.g., 103), or a combination of such.

The memory sub-system can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The host system 101 can be coupled to one or more memory sub-systems. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 101 can include a processor chipset (e.g., processing device) and a software stack executed by the processor chipset. The processor chipset can include one or more cores, one or more caches, a memory controller (e.g., NVDIMM controller), and a storage protocol controller (e.g., PCIe controller, SATA controller). The host system 101 uses the memory sub-system, for example, to write data to the memory sub-system and read data from the memory sub-system.

The host system 101 can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, a serial peripheral interface, or any other interface. The physical host interface can be used to transmit data between the host system 101 and the memory sub-system. The host system 101 can further utilize an NVM Express (NVMe) interface to access components (e.g., memory devices 103) when the memory sub-system is coupled with the host system 101 by the PCIe interface. The physical host interface can provide an interface for passing control, address, data, and other signals between the memory sub-system and the host system 101. In general, the host system 101 can access multiple memory sub-systems via a same communication connection, multiple separate communication connections, and/or a combination of communication connections.

The processing device of the host system 101 can be, for example, a microprocessor, a central processing unit (CPU), a processing core of a processor, an execution unit, etc. In some instances, the memory controller in the host system 101 can be control the communications over a bus coupled between the host system 101 and the memory sub-system. In general, the memory controller can send commands or requests to the memory sub-system for desired access to memory devices 103 and/or 105. The memory controller can further include interface circuitry to communicate with the memory sub-system. The interface circuitry can convert responses received from memory sub-system into information for the host system 101.

The memory controller of the host system 101 can communicate with a controller of the memory sub-system to perform operations such as reading data, writing data, or erasing data at the memory devices 103 and/or 105 and other such operations. In some instances, the memory controller is integrated within the same package of the processing device of the host system 101. In other instances, the memory controller is separate from the package of the processing device of the host system. The memory controller and/or the processing device of the host system 101 can include hardware such as one or more integrated circuits (ICs) and/or discrete components, a buffer memory, a cache memory, or a combination thereof. The memory controller and/or the processing device of the host system 101 can be a microcontroller, special purpose logic circuitry (e.g., a field programmable gate array (FPGA), an application specific integrated circuit (ASIC), etc.), or another suitable processor.

The memory devices 103 and 105 can include any combination of the different types of non-volatile memory components and/or volatile memory components. The volatile memory devices (e.g., memory device 105) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 103 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 103 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EE-PROM).

A memory sub-system can have a controller configured to communicate with the memory devices 103 and 105 to perform operations such as reading data, writing data, or erasing data at the memory devices 103 and 105 and other such operations (e.g., in response to commands scheduled on a command bus by the memory controller of the host system 101). The controller of the memory sub-system can include hardware such as one or more integrated circuits (ICs) and/or discrete components, a buffer memory, or a combination thereof. The hardware can include digital circuitry with dedicated (i.e., hard-coded) logic to perform the operations described herein. The controller of the memory sub-system can be a microcontroller, special purpose logic circuitry (e.g., a field programmable gate array (FPGA), an application specific integrated circuit (ASIC), etc.), or another suitable processor.

The controller of the memory sub-system can include a processing device or processor configured to execute instructions stored in a local memory. In an example, the local memory of the memory sub-system includes an embedded memory configured to store instructions for performing various processes, operations, logic flows, and routines that control operation of the memory sub-system, including handling communications between the memory sub-system and the host system 101.

In some embodiments, the local memory of the memory sub-system can include memory registers storing memory pointers, fetched data, etc. The local memory can also include read-only memory (ROM) for storing micro-code. In one example, a memory sub-system a controller; and in another example, a memory sub-system does not include a controller, and can instead rely upon external control (e.g., provided by an external host, or by a processor or controller separate from the memory sub-system).

In general, the controller of the memory sub-system can receive commands or operations from the host system 101 and can convert the commands or operations into instructions or appropriate commands to achieve the desired access to the memory devices 103. The controller of the memory sub-system can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 103. The controller of the memory sub-system can further include host interface circuitry to communicate with the host system 101 via the physical host interface. The host interface circuitry can convert the commands received from the host system into command instructions to access the memory devices 103 as well as convert responses associated with the memory devices 103 into information for the host system 101.

The memory sub-system can also include additional circuitry or components that are not illustrated. In some embodiments, the memory sub-system can include a cache or buffer (e.g., DRAM) and address circuitry (e.g., a row decoder and a column decoder) that can receive an address from the controller of the memory sub-system and decode the address to access the memory devices 103.

In some embodiments, the memory devices 103 include local media controllers that operate in conjunction with memory sub-system controller to execute operations on one or more memory cells of the memory devices 103. An external controller (e.g., memory sub-system controller) can externally manage the memory device 103 (e.g., perform media management operations on the memory device 103). In some embodiments, a memory device 103 is a managed memory device, which is a raw memory device combined with a local controller for media management within the same memory device package. An example of a managed memory device is a managed NAND (MNAND) device.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

communicating, between a memory device and a host system, a clock signal over a first control line of a serial peripheral interface bus connected between the memory device and the host system;

communicating, between the memory device and the host system, an item over a plurality of data lines of the serial peripheral interface bus during a first time period of one or more clock cycles identified using the clock signal;

computing a cyclic redundancy check value of the item;

communicating, between the memory device and the host system, the cyclic redundancy check value over the plurality of data lines during a second time period of one or more clock cycles identified using the clock signal;

determining whether a communication error has occurred in transmission of the item and the cyclic redundancy check value over the serial peripheral interface bus; and setting an error bit in a status register in the memory device in response to a determination that a communication error has occurred in transmission of the item and the cyclic redundancy check value over the serial peripheral interface bus;

wherein the determining of whether a communication error has occurred is based on comparing the cyclic redundancy check value received via the serial peripheral interface bus and a cyclic redundancy check value computed from the item received via the serial peripheral interface bus;

wherein the second time period follows the first time period without a time gap longer than a quarter of a clock cycle.

2. The method of claim 1, wherein the item is a 8-bit command; the 8-bit command is transmitted via four data lines, or eight data lines, in the serial peripheral interface bus over two first clock cycles, or one first clock cycle, in the first time period; and the cyclic redundancy check value is transmitted via the four data lines over two second clock cycles, or via the eight data lines over one second clock cycle, in the second time period.

3. The method of claim 2, further comprising:

communicating, from the host system to the memory device, a 24-bit address and a cyclic redundancy check value computed from the 24-bit address, over the four data lines in four clock cycles following the two second clock cycles, or over the eight data lines in two clock cycles following the one second clock cycle.

4. The method of claim 1, wherein the item is a 24-bit address; the 24-bit address and the cyclic redundancy check value are transmitted via:

four data lines in the serial peripheral interface bus over four clock cycles in the first time period and the second time period; or eight data lines in the serial peripheral interface bus over two clock cycles in the first time period and the second time period.

5. The method of claim 1, wherein the item is an 8-bit data item; the 8-bit data item and the cyclic redundancy check value are transmitted via:

four data lines in the serial peripheral interface bus over two clock cycles in the first time period and the second time period;

eight lines in the serial peripheral interface bus over one clock cycle in the first time period and the second time period.

6. The method of claim 1, wherein the item is a 512 byte data block;

the data block is transmitted in the serial peripheral interface bus in the first time period;

and the cyclic redundancy check value is transmitted via:

four data lines over two clock cycles in the second time period; or eight data lines over one clock cycle in the second time period.

7. The method of claim 1, further comprising:

asserting an interrupt signal in a second control line of the serial peripheral interface bus in response to a determination that a communication error has occurred in transmission of the item and the cyclic redundancy check value over the serial peripheral interface bus; and re-transmitting the item and the cyclic redundancy check value in response to the interrupt signal.

8. The method of claim 1, further comprising:

terminating, by the host system and in response to a determination that a communication error has occurred in transmission of the item and the cyclic redundancy check value over the serial peripheral interface bus, execution of a current command; and re-transmitting, by the host system, the current command to the memory device.

9. A memory device, comprising:

memory cells;

a serial peripheral interface configured to:

receive a clock signal over a first control line of a serial peripheral interface bus connected between the memory device and a host system;

receive a command to access the memory cells over a plurality of data lines of the serial peripheral interface bus during a first time period identified using the clock signal; and receive a first cyclic redundancy check value over the plurality of data lines during a second time period identified using the clock signal; and a cyclic redundancy check module configured to compute a second cyclic redundancy check value from the command received in the serial peripheral interface and compare the first cyclic redundancy check value and the second cyclic redundancy check value to detect a communication error in transmission of the command;

wherein the second time period is configured to follow the first time period without a time gap longer than a quarter of a clock cycle; and the serial peripheral interface is further configured to receive an address for the command to access the memory cells over the plurality of data lines of the serial peripheral interface bus during a third time period identified using the clock signal.

10. The memory device of claim 9, wherein the second time period is configured to follow the first time period without a time gap longer than a quarter of a clock cycle; and the serial peripheral interface is further configured to:

receive a third cyclic redundancy check value over the plurality of data lines during a fourth time period identified using the clock signal, the fourth time period configured to follow the third time period without the time gap; and wherein the cyclic redundancy check module is further configured to compute a fourth cyclic redundancy check value from the address received in the serial peripheral interface and compare the third cyclic redundancy check value and the fourth cyclic redundancy check value to detect a communication error in transmission of the address for the command; and wherein the command is received over the plurality of data lines at a rate of one bit per clock cycle per data line; and the address is received over the plurality of data lines at a rate of two bits per clock cycle per data line.

11. The memory device of claim 10, wherein the cyclic redundancy check module is further configured to compute a fifth cyclic redundancy check value of a data item retrieved from the memory cells according to the command and the addresses; and wherein the serial peripheral interface is further configured to:

transmit the data item over the plurality of data lines of the serial peripheral interface bus during a fifth time period identified using the clock signal; and transmit the fifth cyclic redundancy check value over the plurality of data lines during a sixth time period identified using the clock signal, the sixth time period configured to follow the fifth time period without the time gap; and wherein the data item is received over the plurality of data lines at a rate of two bits per clock cycle per data line.

12. The memory device of claim 10, wherein the serial peripheral interface is further configured to:

receive a data item to be written into the memory cells over the plurality of data lines of the serial peripheral interface bus during a fifth time period identified using the clock signal; and receive a fifth cyclic redundancy check value over the plurality of data lines during a sixth time period identified using the clock signal, the sixth time period configured to follow the fifth time period without the time gap; and wherein the cyclic redundancy check module is further configured to compute a sixth cyclic redundancy check value from the data item received in the serial peripheral interface and compare the fifth cyclic redundancy check value and the sixth cyclic redundancy check value to detect a communication error in transmission of the data item; and wherein the data item is received over the plurality of data lines at a rate of two bits per clock cycle per data line.

13. The memory device of claim 12, wherein the memory device is further configured to, in response to an error detected in the command, the address, or the data item:

set an error bit in a status register; or assert an interrupt signal in a second control line of the serial peripheral interface bus to cause the host system to re-transmit the command, the address, or the data item.

14. A host system, comprising:

a cyclic redundancy check module configured to compute a first cyclic redundancy check value of a command, and a third cyclic redundancy check value of an address; and a serial peripheral interface configured to:

transmit a clock signal over a first control line of a serial peripheral interface bus connected between the host system and a memory device;

transmit the command to access the memory device over a plurality of data lines of the serial peripheral interface bus during a first time period identified using the clock signal;

transmit the first cyclic redundancy check value of the command over the plurality of data lines during a second time period identified using the clock signal, wherein the second time period is configured to follow the first time period without a time gap longer than a quarter of a clock cycle;

transmit the address for the command over the plurality of data lines of the serial peripheral interface bus during a third time period identified using the clock signal; and transmit the third cyclic redundancy check value over the plurality of data lines during a fourth time period identified using the clock signal, the fourth time period configured to follow the third time period without the time gap;

wherein the memory device is configured to compute a second cyclic redundancy check value of the command and a fourth cyclic redundancy check value of the address to detect an error in transmission of the command and the address; and in response to the error, the memory device is configured to assert an interrupt signal in a second control line of the serial peripheral interface bus.

15. The host system of claim 14, wherein the cyclic redundancy check module is further configured to compute a fifth cyclic redundancy check value of a data item; and wherein the serial peripheral interface is further configured to:

transmit the data item over the plurality of data lines of the serial peripheral interface bus during a fifth time period identified using the clock signal; and transmit the fifth cyclic redundancy check value over the plurality of data lines during a sixth time period identified using the clock signal, the sixth time period configured to follow the fifth time period without the time gap;

wherein the memory device is configured to compute a sixth cyclic redundancy check value of the data item to detect an error in transmission of the data item; and in response to an error in transmission of the data item, the memory device is configured to assert an interrupt signal in the second control line of the serial peripheral interface bus; and wherein the host system is further configured to re-transmit the command, the address or the data item in response to an interrupt signal in the second control line of the serial peripheral interface bus.

16. The host system of claim 14, wherein the serial peripheral interface is further configured to:

receive a data item, provided by the memory device in response to the command, over the plurality of data lines of the serial peripheral interface bus during a fifth time period identified using the clock signal; and receive a fifth cyclic redundancy check value over the plurality of data lines during a sixth time period identified using the clock signal, the sixth time period configured to follow the fifth time period without the time gap;

wherein the cyclic redundancy check module is further configured to:

compute a sixth cyclic redundancy check value from the data item received over the plurality of data lines; and compare the fifth cyclic redundancy check value and the sixth cyclic redundancy check value to detect an error in transmission of the data item; and wherein the command is transmitted the plurality of data lines at a rate of one bit per clock cycle per data line; the address is transmitted over the plurality of data lines at a rate of two bits per clock cycle per data line; and the data item is received over the plurality of data lines at a rate of two bits per clock cycle per data line.

17. The host system of claim 16, wherein the host system is further configured to:

terminate, in response to an error detected in transmission of the data item, execution of the command; and re-transmit the command to the memory device.

\* \* \* \* \*